United States Patent
Vallström et al.

(10) Patent No.: US 7,804,827 B2
(45) Date of Patent: Sep. 28, 2010

(54) METHOD FOR ENSURING ADEQUACY OF TRANSMISSION CAPACITY, TERMINAL EMPLOYING THE METHOD, AND SOFTWARE MEANS FOR IMPLEMENTING THE METHOD

(75) Inventors: Jari Vallström, Oulu (FI); Markku Vimpari, Oulu (FI); Pekka Kuure, Espoo (FI); Marko Saarenpää, Oulu (FI)

(73) Assignee: Nokia Corporation, Espoo (FI)

( * ) Notice: Subject to any disclaimer, the term of this patent is extended or adjusted under 35 U.S.C. 154(b) by 1758 days.

(21) Appl. No.: 10/761,532

(22) Filed: Jan. 20, 2004

(65) Prior Publication Data

US 2004/0160950 A1      Aug. 19, 2004

(30) Foreign Application Priority Data

Feb. 14, 2003   (FI) .................................. 20030237

(51) Int. Cl.
*H04L 12/56* (2006.01)

(52) U.S. Cl. ................... 370/389; 370/341; 370/349; 370/352; 370/392; 370/471; 370/474; 370/523; 375/220; 379/88.23; 704/201; 704/210; 704/215; 704/229; 704/230

(58) Field of Classification Search ................ 370/341, 370/349, 352, 438, 389, 392, 471, 474, 523; 704/201, 210, 215, 229, 230
See application file for complete search history.

(56) References Cited

U.S. PATENT DOCUMENTS

| | | | | |
|---|---|---|---|---|
| 4,665,514 A * | 5/1987 | Ching et al. | ............... | 370/392 |
| 5,115,429 A * | 5/1992 | Hluchyj et al. | ............... | 370/231 |
| 5,754,554 A * | 5/1998 | Nakahara | ............... | 370/498 |
| 6,049,537 A * | 4/2000 | Proctor et al. | ............... | 370/342 |
| 6,240,299 B1 * | 5/2001 | Song | ............... | 455/550.1 |
| 6,556,587 B1 * | 4/2003 | Svanbro et al. | ............... | 370/471 |
| 6,556,844 B1 * | 4/2003 | Mayer | ............... | 455/560 |
| 6,907,030 B1 * | 6/2005 | Bladsjo et al. | ............... | 370/349 |
| 7,027,989 B1 * | 4/2006 | Tapadar et al. | ............... | 704/270 |
| 7,072,296 B2 * | 7/2006 | Turner et al. | ............... | 370/230.1 |
| 7,248,571 B1 * | 7/2007 | Ilas et al. | ............... | 370/336 |
| 2001/0018770 A1 * | 8/2001 | Eryurtlu et al. | ............... | 725/91 |
| 2004/0228326 A1 * | 11/2004 | Pearson | ............... | 370/352 |

FOREIGN PATENT DOCUMENTS

| | | |
|---|---|---|
| EP | 0 642 285 A1 | 3/1995 |
| EP | 1180871 A2 | 2/2002 |
| EP | 1220498 A2 | 7/2002 |
| WO | WO 96/28809 A1 | 9/1996 |
| WO | WO 01/73989 A1 | 10/2001 |
| WO | WO-02/082772 A2 | 10/2002 |
| WO | WO-03/003668 A1 | 1/2003 |
| WO | WO-03/047138 A1 | 6/2003 |

* cited by examiner

*Primary Examiner*—William Trost, IV
*Assistant Examiner*—Toan D Nguyen
(74) *Attorney, Agent, or Firm*—Harrington & Smith

(57) ABSTRACT

The invention relates to a method for ensuring the adequacy of transmission capacity in a digital packet-switched cellular network where both voice sample packets and associated header fields are transmitted in real time in one and the same transmission channel. The invention also relates to a terminal employing the method. In the method, the contents of voice sample packets at the beginning of a speech spurt are partly replaced by packet header field data in situations where the combined bit count of voice sample data and packet header data exceeds the transmission capacity of the transmission channel.

15 Claims, 3 Drawing Sheets

METHOD FOR ENSURING ADEQUACY OF TRANSMISSION CAPACITY, TERMINAL EMPLOYING THE METHOD, AND SOFTWARE MEANS FOR IMPLEMENTING THE METHOD

FIELD OF THE INVENTION

The invention relates to a method for ensuring the adequacy of transmission capacity in a digital packet-switched cellular network where both voice sample packets and associated header fields are transmitted in real time in one and the same transmission channel. The invention also relates to a terminal employing the method as well as software means needed in the implementation of the method.

BACKGROUND OF THE INVENTION

Circuit-switched connections, whether in analog or digital transmission, have traditionally been used for voice connections. A circuit-switched connection, however, is inefficient as regards transmission efficiency. A communications connection, once established, remains reserved even if there is nothing to transmit.

Data can also be transmitted using packet-switched technology. Such a type of technology has long been used in communication between computers. The Internet is one example of how data can be transmitted from one place to another using packet-based communication. In a packet-switched network the data to be transmitted are arranged in blocks/packets of certain length. Before sending, at least the destination address is additionally inserted in each packet. Thus, in addition to the user data proper, whether it be voice or something else, also other data are being transmitted at the same time. Such supplementary data are inserted in the header fields of the packets transmitted.

With some applications the size of the header fields becomes fairly large in comparison with the user data proper. This problem is emphasized by the fact that the packets comprise transmission protocols layered on top of each other, which protocols all have header field needs and forms of their own. Examples of such interrelated transmission protocols with their header fields include the Internet Protocol (IP), User Datagram Protocol (UDP) and the Real Time Protocol (RTP) which can be used e.g. to establish a real-time packet-switched voice connection between parties. In this example, as well, the layered protocol structure naturally increases the header field data.

Attempts have been made to alleviate this problem through frame compression. Frame compression aims to remove the header-related data that are identical in successive frames, or that are such that the information associated can be easily derived from the packets received previously. One such compression method according to the prior art is called Robust Header Compression (ROHC). Even with ROHC applied, the frame header data result in a considerable increase in data to be transmitted. For example, in a VoIP (Voice over IP) call, a ROHC-compressed voice packet could include 15 bytes of voice samples and 4 bytes of data related to header fields. In other words, the proportion of header data in all data transmitted is fairly large in spite of the compression. When such a call is directed onto a bandwidth-limited transmission path, problems ensue. For instance, in a GPRS (General Packet Radio Service) network the transmission band on the radio path may prove to be narrow compared to the transmission capacity required.

With compression methods, uncompressed frames are usually used in conjunction with the first packets transmitted. For example, in Degermark compression, which is used for IP packets, the packets numbered 1, 3, 6, 11, 20, . . . have uncompressed header fields. Once continuous packet transmission has been started after the beginning of a speech spurt, the transmission of uncompressed header fields can be decreased. Then, for example, every 64th header field will be uncompressed.

One possible way of establishing a connection over a packet-switched GPRS network is to use PoC (Push to talk over Cellular). Several people may participate in a PoC session simultaneously. People take turns speaking, and the direction of transmission varies. There is thus a great need to transmit uncompressed header fields during a PoC connection. A PoC connection may use one coding method CS-1 (Coding Scheme) allowed in the GPRS. This coding scheme allows for a large cell size at the cost of transmission speed. As the nature of PoC is such that a great number of packets are transmitted in a session with uncompressed header data, the coding scheme selected may result in that the radio channel used may prove small always during the first packets sent in a particular direction. Therefore, the bit rate used on a PoC radio channel varies greatly and in some cases it may exceed the maximum available transmission capacity. Later on, the bit rate required by the PoC connection is decreased because frame compression can be effectively utilized. As regards capacity-limited radio path, this situation is not optimal. In an optimum situation, the radio channel is loaded as evenly as possible throughout the whole connection time available.

Digital circuit-switched connections utilize so-called frame stealing. This means that data blocks reserved for voice samples are stolen here and there for urgent data transmission needs. At a receiver end, no speech signal is thus received in these time slots. However, the listener receiving the voice sample will not perceive that a voice sample has been removed from the signal received. Using frame stealing, for example in the GSM (Global System for Mobile communications) networks, it is possible in urgent cases to allocate the FACCH (Fast Associated Control Channel) onto the frames that have been intended for voice samples frames.

SUMMARY OF THE INVENTION

An object of the present invention is to provide a method with which a band-limited radio channel can be used optimally for packet-switched connections utilizing header field compression. With the method according to the invention the average available bit rate can be used on the radio path for the whole duration of the transmission.

The objects of the invention are achieved by a method in which a frame stealing is performed from the first voice samples in favour of uncompressed packet header fields at the beginning of a speech spurt when the overall transmission requirement possibly exceeds the available radio channel capacity.

An advantage of the invention is that the average bit rate on a packet-switched communications connection, using frame compression, can be maintained within the limits allowed by the channel for the whole duration of the connection.

Another advantage of the invention is that the radio channel capacity can be fully utilized and need not be increased for certain special situations.

The method according to the invention for ensuring the adequacy of transmission capacity is characterized in that if the total combined bit count of the voice sample and header field in a packet to be transmitted exceeds the transmission capacity available in the transmission channel, the number of bits in the voice sample is reduced or at least one whole voice block is stolen and the number of bits saved is used to transmit header field data of the same packet.

The cellular terminal according to the invention is characterized in that it comprises both a means for reducing the number of voice samplebits in a packet to be transmitted and a means for using the bits thus saved for the transmission of header field data of the same packet.

Preferred embodiments of the invention are presented in the dependent claims.

The basic idea of the invention is as follows: The invention utilizes the known fact that possible errors especially at the beginning of speech received are not noticed by a listener as well as errors or deviancies in the middle of speech. This provides an opportunity to use frame stealing on packet-switched voice connections. When a speech spurt begins, some voice sample blocks can be left untransmitted, if necessary, if the overall bit count with the voice sample and frame information is found to exceed the transmission capacity of the radio channel. Frame stealing according to the invention may also be performed automatically at the beginning of every speech spurt. Instead of a voice sample an empty block can be advantageously transmitted the size of which is about a tenth of the size of an ordinary voice sample block. The transmission capacity obtained from the stolen voice blocks is advantageously used for transmitting the necessary header fields. Thus, the limited transmission capacity of the radio channel will not be exceeded and undesirable delays will not occur. After the initial phase, when the frame compression is in full operation, header fields need not be sent in every voice packet. Then the transmission capacity of the radio channel will be highly sufficient for the transmission of voice samples proper. Thus the procedure according to the invention described above can be used to balance the bit rate of data transmitted so that it corresponds to the transmission channel.

BRIEF DESCRIPTION OF THE DRAWINGS

The invention will be described in detail below. The description refers to the accompanying drawings in which.

DETAILED DESCRIPTION

Figure 2:
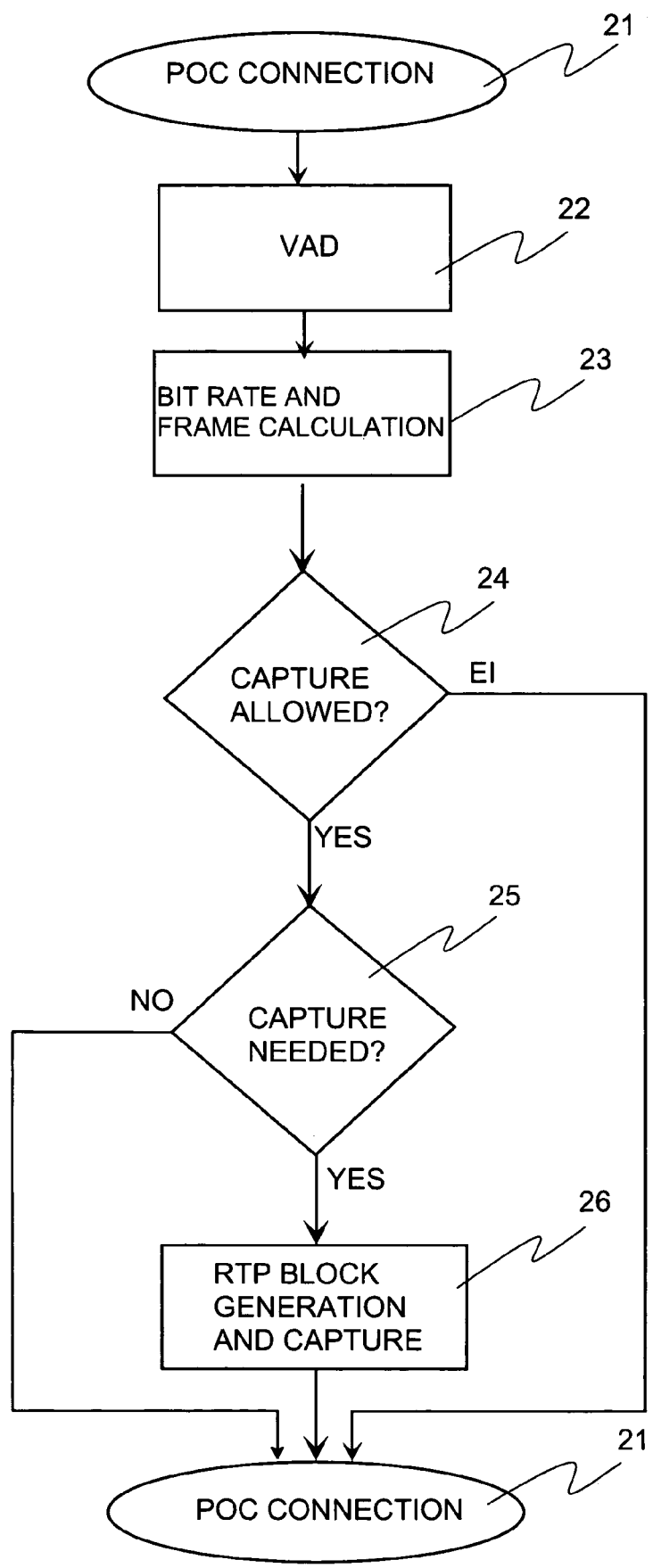
FIG. 2 illustrates, in an exemplary flow diagram, the steps of the method according to the invention.
Figure 3:
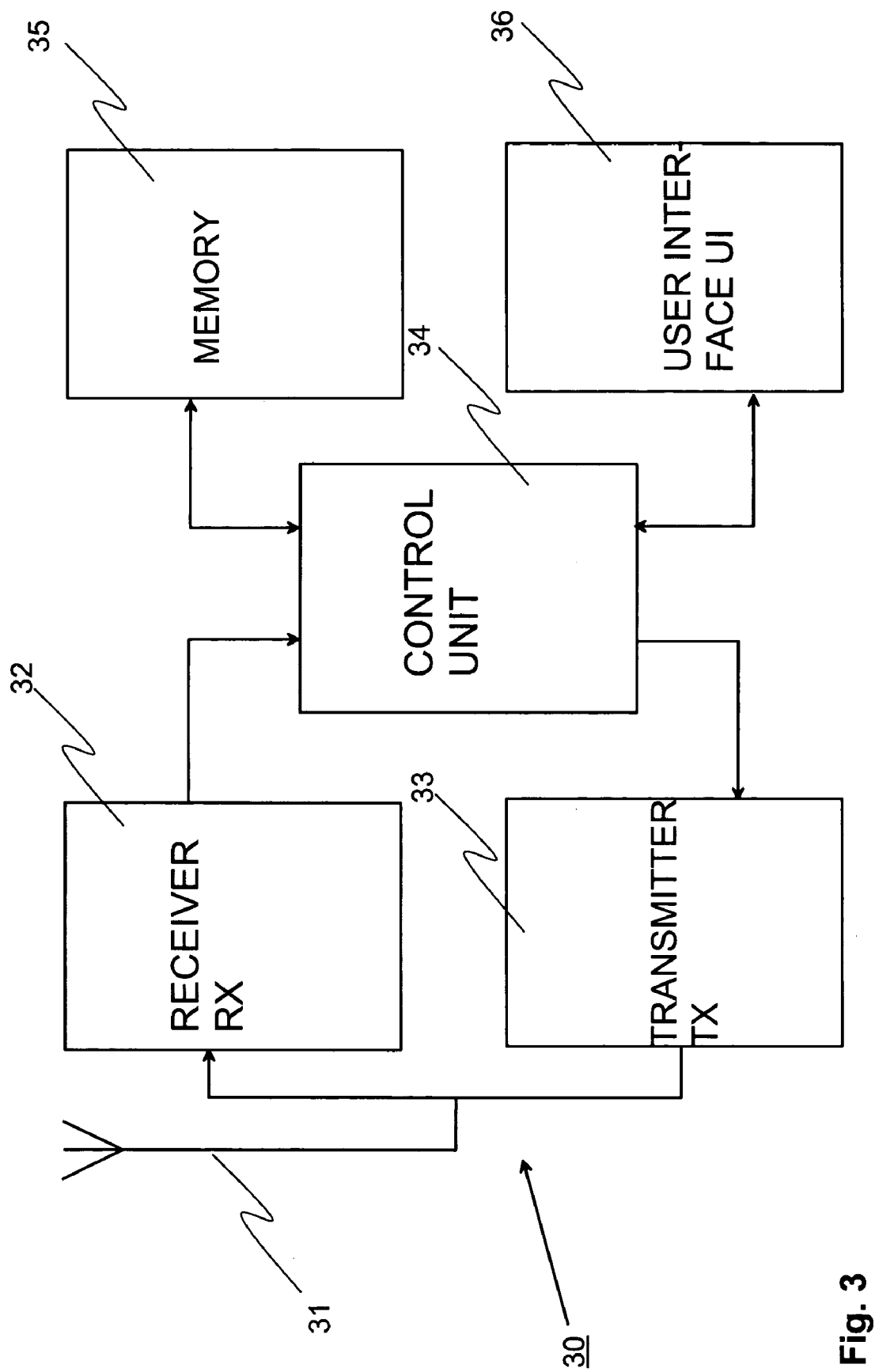
FIG. 3 illustrates an exemplary cellular terminal according to the invention.

The principle of operation of the method according to the invention is illustrated in the exemplary embodiments depicted in FIGS. 2 and 3. The description of the figures uses as an example a real-time PoC connection in a GPRS network, advantageously applying CS-1 coding. Naturally the method according to the invention can be applied in any digital packet-switched network where voice samples are to be transmitted in real time in a capacity-limited environment.

Figure 1:
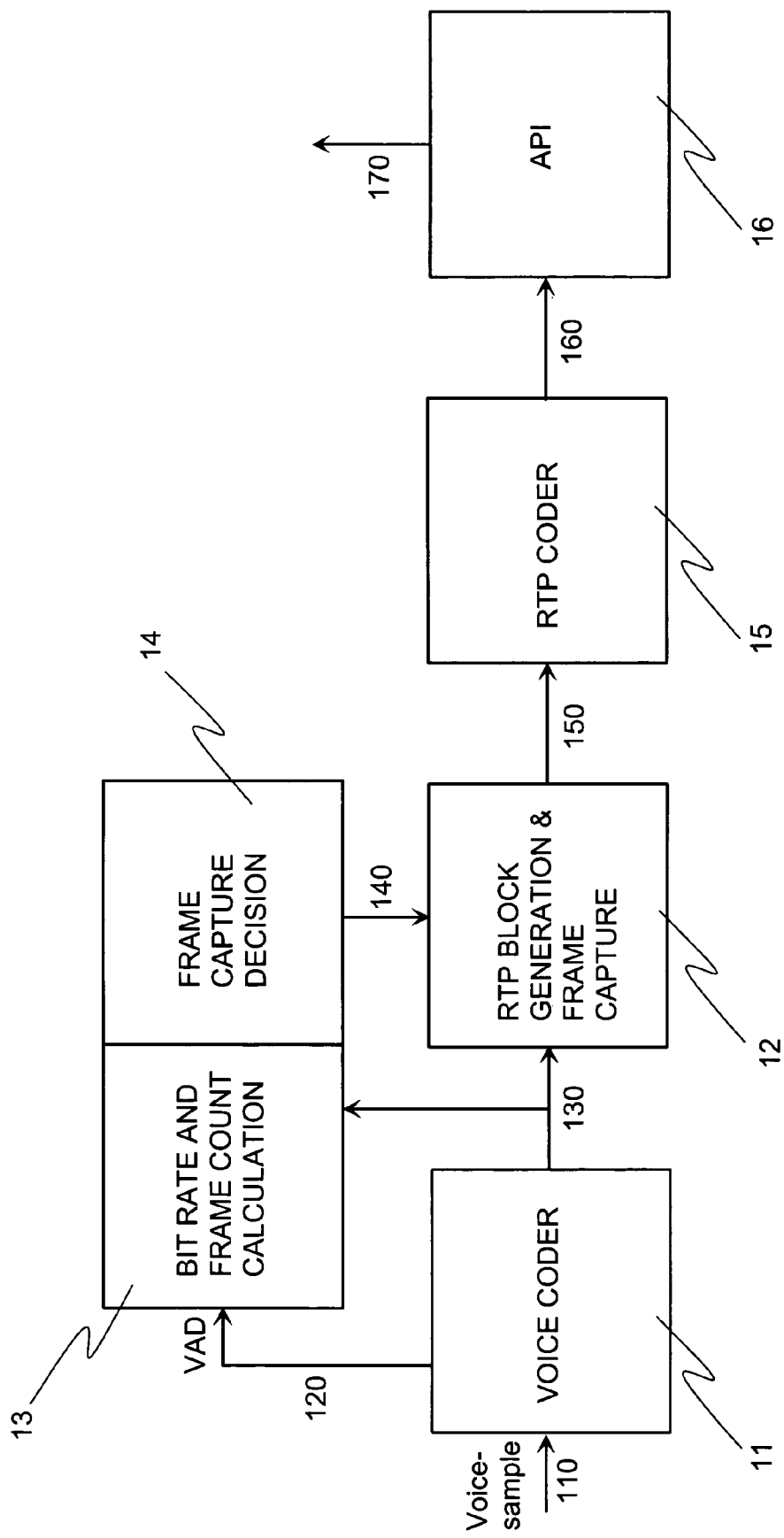
FIG. 1 illustrates, in an exemplary block diagram, the application of the method according to the invention.

The exemplary block diagram of FIG. 1 shows the functional blocks that are required to apply the invention in conjunction with the RTP protocol. Reference designator 110 represents a real-time voice/speech sample entering a voice coder 11. The voice coder 11 produces from the voice sample 110 a bit combination 130 which is taken to a RTP block generation and frame stealing block 12 according to the invention. The bit combination 130 output by the voice coder 11 is also directed to a bit rate and frame count calculation block 13 according to the invention. To that same block 13 it is also directed a voice activity detection (VAD) 120 signal from the voice coder 11. The VAD indicates whether or not voice samples 110 are being received at a particular moment. Based on the VAD, it is possible in a prior-art transmitter to generate either silence description (SID) blocks or NO_DATA blocks, which are transmitted at those times when there are no voice/speech samples 110 to transmit.

At the calculation block 13 it is calculated in real-time the bit rate required for the transmission of the bit combination 130 obtained from the voice/speech sample 110 and the amount of capacity that has to be reserved for the transmission of packet header fields. In the case of a PoC connection, CS-1 coding sets an upper limit for the data transmitted per unit of time.

Closely associated with the calculation block 13 is another functional block 14 where a decision is made about the frame stealing according to the invention. Advantageously two separate factors are used as criteria for the decision. The first criterion is the fact whether it is voice blocks from the beginning of a speech spurt that are being processed at the moment or if the transmission of voice blocks has been going on already for hundreds of milliseconds, e.g. 500 ms. If no more than the time mentioned has passed from the first VAD signal 120 arrived at the calculation block 13, the frame stealing according to the invention can be advantageously applied. The voice sample packets being processed are in that case from the beginning of the speech spurt, and omitting them from the received signal will not annoy the receiver. If the received VAD signal 120 is outside the time window mentioned above, counting from the first VAD signal received, the frame stealing according to the invention will not be applied. The voice samples in that case would be from the middle or end of a speech spurt, and their absence could be experienced disturbing by the receiver.

The other decision criterion for the frame stealing according to the invention is the total combined amount of bits both in the header field bits in the frames transmitted and the bits in the bit combination 130 required by the voice samples 110, calculated in block 13. When using frame compression, in conjunction with the first voice samples, complete header fields must be transmitted. During packets transmitted later, frame compression will reduce the amount of data needed in the transmission of header fields. If in block 13 the calculation result exceeds the number of bits allowed with CS-1 coding at the beginning of transmission, the method according to the invention is advantageously used. The decision 140 about frame stealing is made in block 14 when both of the above-mentioned criteria are met simultaneously.

An advantageous frame stealing technique is, for example to steal two voice blocks, from first third, sixth, eleventh and twentieth packets transmitted at the beginning of a speech spurt. Stealing of one Adaptive Multi-Rate (AMR) voice block gives 14 bytes. In that case, the stealing of two voice blocks will meet the space requirement of long headers, which in IPv4 is 20 bytes and for UDP, 8 bytes. Thus, two stolen AMR blocks will enable carrying both the IPv4 and UPD header data. Later, the corresponding compressed IPv4 and UDP headers will only require 2 bytes, so they can be transmitted without using the frame stealing according to the invention.

When the decision 140 has been made, in block 12 the bit combinations 130 coded from received voice samples 110 are replaced by empty NO_DATA blocks in RTP blocks to be formed.

The resulting preliminary RTP blocks 150 according to the invention are directed from block 12 to a RTP encoder 15. The RTP encoder 15 will process the data blocks 150 to be transmitted so that they comply with the IETF (Internet Engineering Task Force) standard RFC 1889. The standard compliant RTP blocks 160 are taken to an API (Application Program Interface) 16 and from there on to functional blocks not shown in FIG. 1 as standard compliant RTP blocks 170 to be further transmitted onto a wireless transmission path.

In the exemplary flow chart of FIG. 2 the invention is applied to a PoC connection. At step 21 there has been established an active PoC connection between at least two parties. At least one of the transmitters advantageously utilizes the functional parts depicted in FIG. 1. Therefore, the status of the VAD is all the time monitored at this transmitter. VAD indication is given at step 22. Consequently, at step 23, there is started continuous calculation of the total bit count needed in the transmission of voice sample data and frame header fields.

In step 24 it is checked which part of the speech spurt is being processed at that moment. Frame stealing according to the invention is advantageously applied during a time window extending to a few hundred milliseconds, advantageously 500 ms at the most, from the beginning of a speech spurt. Errors or anomalies in the signal during that time frame will not annoy the receiver to a significant extent. If it is found out in step 24 that the time window is inappropriate, the method according to the invention will not be applied, and the process returns to step 21 where the operation continues in accordance with the PoC connection.

If in step 24 it is decided that frame stealing according to the invention can be applied as far as the transmission time is concerned, it is then decided in step 25 whether frame stealing is needed or not. If not, the process returns to the initial state 21 where the operation continues in accordance with the PoC connection.

Naturally, frame stealing according to the invention may also be applied without the step 24 described above. In such an embodiment frame stealing is allowed at any phase of a speech spurt at the expense of the receiver possibly noticing the absence of voice samples.

If in the case of a PoC connection the total amount of bits to be transmitted according to the calculation based on the invention exceeds the maximum bit count allowed in CS-1, some voice sample frames are replaced by NO_DATA blocks in step 26 in accordance with the invention. This operation also leads to step 21, and the process according to the invention starts over. At some point of time the time window, in which the method according to the invention can be applied, passes. This is detected in step 24, whereafter the PoC session will continue for the rest of the speech spurt in accordance with the prior art.

The method according to the invention is advantageously applied using a software application stored on a transmitting device. This software application implements at least some of the steps of the method described above.

The method according to the invention can be applied only at a transmitting terminal. A RTP packet processed and transmitted using the method according to the invention will not require any changes in the receiver or transmitting network. Thus it can be transmitted and received using completely prior-art means.

FIG. 3 shows, as an example, a wireless terminal 30 with its main functional blocks, capable of utilizing the method according to the invention. The terminal 30 uses an antenna 31 in the transmission and reception of RTP packets. Reference designator 32 represents the means that constitute the receiver RX through which the wireless terminal 30 receives RTP packets from a cellular network. The receiver RX comprises prior-art means for all packets received.

Reference designator 33 represents the means that constitute the transmitter TX in the wireless terminal 30. The transmitter means 33 perform all the necessary signal processing measures on the outgoing RTP packets that are required when communicating with a cellular network. Similarly, the transmitter means can be advantageously used to perform the frame stealing according to the method according to the invention.

From the invention point of view, the crucial unit in the terminal is a control unit 34 which controls the operation of the terminal 30. It controls the operation of all the main parts belonging to the terminal 30. It controls both receiving and transmitting functions. It is further used to control the user interface UI 36 and the memory 35. In the method according to the invention it is the control unit 34 that determines when the frame stealing according to the invention can be applied or must be applied, steps 23, 24 and 25 in FIG. 2. Furthermore, it is the control unit 34 that instructs the transmitter means to perform the frame stealing according to the invention, step 26 in FIG. 2.

The software application required by the control unit 34 to execute the process according to the invention advantageously resides in the memory 35.

The user interface UI 36 is utilized in controlling the terminal's functions.

Some embodiments according to the invention are described above. The invention is not restricted to the above-described exemplary embodiments involving a PoC session. The invention can be applied in any digital cellular network where real-time data is to be transferred and where the amount of such data may occasionally exceed the available capacity of the communications channel used. Furthermore, the inventional idea can be applied in numerous ways within the scope defined by the claims attached hereto.

The invention claimed is:

1. A method comprising:
   determining, in a speech spurt, a combined bit count of a voice sample and a header field of a voice packet;
   if a wireless terminal of a packet-switched network estimates that the combined bit count exceeds an available transmission capacity of a transmission channel allocated to the terminal, then determining if the voice packet is located before a certain location in the speech spurt;
   if the voice packet is determined to located before the certain location,
   then stealing at least one entire voice block for header field data of the voice packet,
   else, reducing a number of bits in the voice sample and using the reduced voice sample bits for transmitting the header field data of the voice packet.

2. The method according to claim 1 wherein a voice sample replacement is performed when no more than 500 ms have passed from a first voice activity detection included in the speech spurt.

3. A memory comprising computer readable code for implementing the method of claim 2.

4. The method according to claim 1 wherein the reduction of the number of bits in the voice sample is performed by replacing the contents of a voice packet with a NO_DATA block.

5. A memory comprising computer readable code for implementing the method of claim 4.

6. A memory comprising computer readable code for implementing the method of claim 1.

7. An apparatus comprising:
a means for reducing a number of bits in a voice sample included in a voice packet to be transmitted in a speech spurt;
a means for deciding between using said reduced bits of the voice sample for transmitting header field data of the voice packet in a digital packet-switched network and stealing at least one entire block based on a location of the voice packet in the speech spurt;
means for stealing the at least one entire block for the header field data of the voice packet; and
means for using said reduced bits of the voice sample for transmitting the header field data of the voice packet.

8. The apparatus according to claim 7 wherein the means for reducing the number of bits in the voice sample included in the voice packet to be transmitted; the means for deciding between using said reduced bits of the voice sample for transmitting header field data of the voice packet in the digital packet-switched network and stealing at least one entire block; the means for stealing the at least one entire block; and means for using saved bits for transmitting header field data of the same packet comprise:
a voice coder for converting the voice sample into a bit combination and for producing a voice activity detection indication,
a bit rate and frame count calculation block for calculating a combined bit count for bits in the bit combination transmitted in the voice packet and bits in the header field after the voice activity detection indication,
a frame stealing decision block for making a frame stealing decision based on the calculation result from the bit rate and frame count calculation block, and
a real time protocol block generation and frame stealing block for replacing in the packet to be transmitted, subsequent to the frame stealing decision, bits in the bit combination produced from the voice sample.

9. The apparatus according to claim 7, wherein the means for reducing a number of bits in the voice sample are arranged so as to perform a replacement when no more than 500 ms have passed from a first voice activity detection included in the speech spurt.

10. The apparatus according to claim 7 wherein the means for reducing the number of bits in the voice sample, a bit rate and frame count calculation block is configured to replace contents of the voice packet with a NO_DATA block.

11. An apparatus teminal comprising:
a controller for processing an algorithm for reducing a number of bits in a voice sample included in a voice packet to be transmitted and using the reduced bits of the voice sample for transmitting header field data in the voice packet in a speech spurt, the apparatus configured to transmit the packet in a digital packet-switched cellular network, the controller configured to determine if the voice packet is located before a certain location in the speech spurt and, if the voice packet is determined to be from before the certain location, then the controller is configured to steal at least one entire voice block for header field data of the voice packet, else, the controller is configured to reduce a number of bits in the voice sample and use the reduced voice sample bits for transmitting the header field data of the voice packet.

12. The apparatus of claim 11, further comprising a memory configured to store and retrieve the algorithm.

13. The apparatus of claim 12, the controller comprising a voice coder for converting the voice sample into a bit combination and for producing a voice activity detection indication; a bit rate and frame count calculation block for calculating a combined bit count for bits in the header field after the voice activity detection indication; a frame stealing decision block for making a frame stealing decision based on a calculation result from the bit rate and frame count calculation block; and a real time protocol block generation and frame stealing block for replacing in the packet to be transmitted, subsequent to the frame stealing decision, bits in the bit combination produced from the voice sample.

14. The apparatus of claim 13, the controller arranged to reduce the number of bits in the voice sample only for packets transmitted at or after the certain location.

15. The apparatus of claim 14, further comprising a user interface configured to enter data that is provided to the controller and a transmitter configured to transmit the voice packet.

* * * * *

UNITED STATES PATENT AND TRADEMARK OFFICE
CERTIFICATE OF CORRECTION

PATENT NO.        : 7,804,827 B2
APPLICATION NO.   : 10/761532
DATED             : September 28, 2010
INVENTOR(S)       : Vallstrom et al.

It is certified that error appears in the above-identified patent and that said Letters Patent is hereby corrected as shown below:

Claim 11, col. 8, line 5 delete "teminal" in between apparatus and comprising.

Signed and Sealed this

Thirtieth Day of November, 2010

David J. Kappos
*Director of the United States Patent and Trademark Office*